(12) United States Patent
Perricone

(10) Patent No.: US 8,615,923 B2
(45) Date of Patent: Dec. 31, 2013

(54) CROP PROTECTOR

(76) Inventor: Karen Perricone, Newport Beach, CA (US)

(*) Notice: Subject to any disclaimer, the term of this patent is extended or adjusted under 35 U.S.C. 154(b) by 0 days.

(21) Appl. No.: 13/438,476

(22) Filed: Apr. 3, 2012

(65) Prior Publication Data

US 2013/0255147 A1 Oct. 3, 2013

(51) Int. Cl.
*A01G 13/02* (2006.01)
(52) U.S. Cl.
USPC .............................. 47/22.1; 47/29.5; 47/20.1
(58) Field of Classification Search
USPC ............ 47/22.1, 20.1, 23.1–31.1, 32.2, 32.3; 135/903; 52/124.1, 128; 160/122, 120, 160/55, 58.1, 66
See application file for complete search history.

(56) References Cited

U.S. PATENT DOCUMENTS

| | | | | |
|---|---|---|---|---|
| 107,584 | A * | 9/1870 | Yenne et al. | 160/58.1 |
| 1,106,624 | A * | 8/1914 | Cadwallader | 47/22.1 |
| 2,107,540 | A * | 2/1938 | Lichtenberg | 366/46 |
| 3,353,297 | A * | 11/1967 | Gervais | 47/29.1 |
| 3,395,485 | A * | 8/1968 | Rooklidge | 47/23.2 |
| 4,296,568 | A | 10/1981 | Dukes | |
| 4,483,127 | A * | 11/1984 | Forkner | 53/580 |
| 4,706,420 | A | 11/1987 | Winkler | |
| 5,305,548 | A * | 4/1994 | Siebol | 47/2 |
| 5,622,197 | A | 4/1997 | Valaire | |
| 5,802,762 | A | 9/1998 | Stonecypher | |
| 5,956,923 | A | 9/1999 | Andros et al. | |
| 6,578,316 | B2 | 6/2003 | Temple et al. | |
| 6,625,924 | B2 | 9/2003 | Lundgren | |
| 6,907,693 | B1 | 6/2005 | Bemben | |
| 7,461,479 | B2 | 12/2008 | Gaudet | |
| 2002/0157696 | A1* | 10/2002 | O'Brien | 135/87 |
| 2004/0134122 | A1* | 7/2004 | Van Bergen-Henegouwen et al. | 47/22.1 |
| 2005/0130621 | A1* | 6/2005 | Flynn | 455/347 |
| 2008/0060262 | A1* | 3/2008 | Lysa | 47/20.1 |

FOREIGN PATENT DOCUMENTS

| | | | | |
|---|---|---|---|---|
| WO | WO 88/05678 | * | 8/1988 | A63C 19/12 |
| WO | WO 01/07126 A1 | * | 2/2001 | A63C 19/12 |

* cited by examiner

*Primary Examiner* — Andrea Valenti
(74) *Attorney, Agent, or Firm* — Brian J. Pangrle

(57) ABSTRACT

A crop protection system can include a housing that houses at least one roller mechanism to carry a roll of material, a vault configured to receive the housing, and a lift mechanism configured to vertically position the housing with respect to the vault. In such a system the housing may include three roller mechanisms where each roller mechanism is configured to carry a roll of material and also include a wire roller mechanism configured to carry a roll of wire. Various other apparatuses, systems, methods, etc., are also disclosed.

14 Claims, 11 Drawing Sheets

CROP PROTECTOR

TECHNICAL FIELD

Subject matter disclosed herein generally relates to equipment and techniques to protect crops.

BACKGROUND

Crops can experience damage when exposed to a variety of factors such as sun, rain, hail, wind, birds, etc. Various equipment, technologies, techniques, etc., are described herein that can optionally be implemented for purposes of crop protection.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
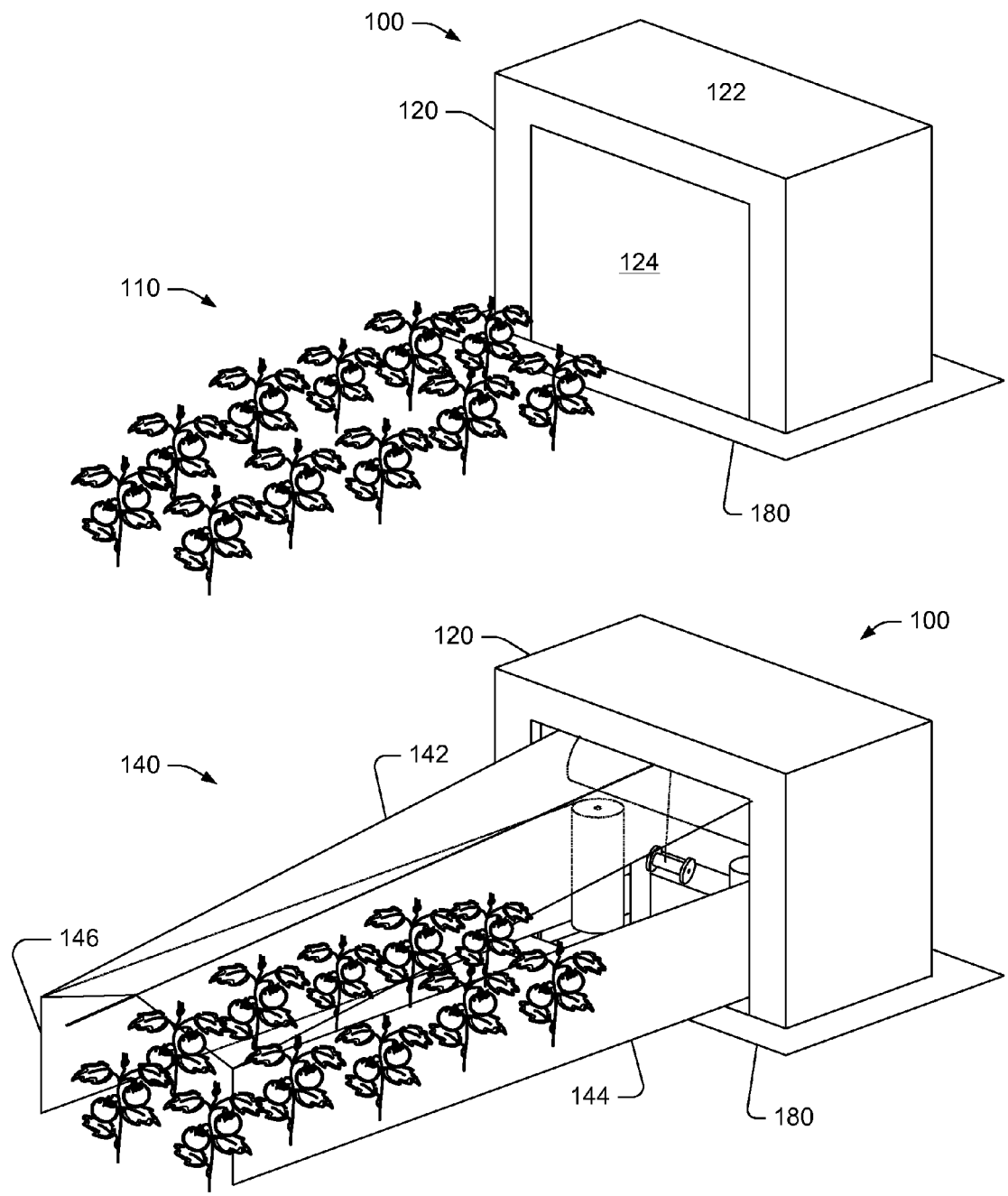
FIG. 1 is a series of perspective views of an example of a crop protection system.

The following description includes the best mode presently contemplated for practicing the described implementations. This description is not to be taken in a limiting sense, but rather is made merely for the purpose of describing general principles of the implementations. The scope of the described implementations should be ascertained with reference to the issued claims.

As described herein, a crop protection system can include a housing that houses at least one roller mechanism to carry a roll of material, a vault configured to receive the housing, and struts configured to vertically position the housing with respect to the vault. In such a system the housing can include three roller mechanisms where each roller mechanism is configured to carry a roll of material and also include a wire roller mechanism configured to carry a roll of wire.

As to managing deployment, retraction or retraction and deployment of material from a roll or rolls, a crop protection system can include at least one motor operatively coupled to at least one roller mechanism, at least one crank operatively coupled to the at least one roller mechanism, at least one spring operatively coupled to the at least one roller mechanism, etc.

A crop protection system can optionally include multiple rolls of material where one of the rolls of material has material that differs from that of another roll (or rolls) of material. For example, a horizontally oriented roll may provide for sun protection, evaporation, etc., while a vertically oriented roll may provide for wind protection.

As described herein, a housing may include a retractable door. As described herein, a vault may be an underground vault (e.g., optionally meeting specifications of underground vaults for utilities, etc.).

As described herein, a crop protection system can include a housing configured to house a first roller mechanism configured to carry a horizontally oriented roll of material, a second roller mechanism configured to carry a vertically oriented roll of material, a third roller mechanism configured to carry a vertically oriented roll of material, and a wire roller mechanism configured to carry a roll of wire for support of material deployed by the first roller mechanism. In such a system, the housing can optionally include a retractable door.

As described herein, a crop protection system can include a first roll of material oriented horizontally by a first roller mechanism, a second roll of material oriented vertically by a second roller mechanism and a third roll of material oriented vertically by a third roller mechanism. In such a system, the first roll of material can optionally material that differs from that of the second roll of material or that of the third roll of material.

As described herein, a crop protection system can include first, second and third roller mechanisms that provide for material deployment and retraction from respective first, second and third rolls of material. In such a system, the first, second and third roller mechanism may optionally include springs, gears, one or more motors, one or more cranks, etc. For example, the system may include a crank, gears, a spring, a motor, etc., operatively coupled to at least one of the first, second or third roller mechanisms. As an example, a crop protection system may include a crank, gears, a spring, a motor, etc., operatively coupled to a wire roller mechanism.

As described herein, a method can include providing an underground vault, providing struts, providing a crop protection system that includes a housing that houses at least one roll of material, and positioning the crop protection system in the underground vault where the struts provide for vertically adjusting the crop protection system with respect to the underground vault. Such a method can include vertically adjusting the crop protection system to position at least a portion of the crop protection system above ground.

FIG. 1 shows a crop protection system 100 with respect to crops 110, which may be arranged in a row, rows, etc., and may vary in height, for example, depending on nature of the crop, time in a growing season, etc.

In the example of FIG. 1, the system 100 includes a housing 120 that includes a top surface 122 and an opening covered by a door 124. The housing 120 is shown with respect to a foundation 180, which may optionally be part of a vault. The housing 120 houses material 142, 144 and 146, that may be deployed adjacent to the crops 110. For example, the material 142 may be deployed over the crops 110 while the material 144 and 146 may be deployed along respective sides of the crops 110. As described herein, in the example if FIG. 1, the system 100 is flexible in that any arrangement of material may be provided for crops and in that the material deployed may differ. For example, the material 142 may differ from the material 144 and the material 146. In such an example, the material 142 may provide for evaporation (e.g., include openings such as slits or holes) while the material 144 and the material 146 may be solid. Further, a material may be selected as to properties to contain heat energy, absorb heat energy, deflect heat energy, etc. (e.g., consider radiation from the sun, radiation from the earth, heat generated due to biological process, heat generated due to chemical processes, heat generated due to physical processes, etc.). As described herein, material may be netting, sheeting, polymeric, organic, etc.

Figure 2:
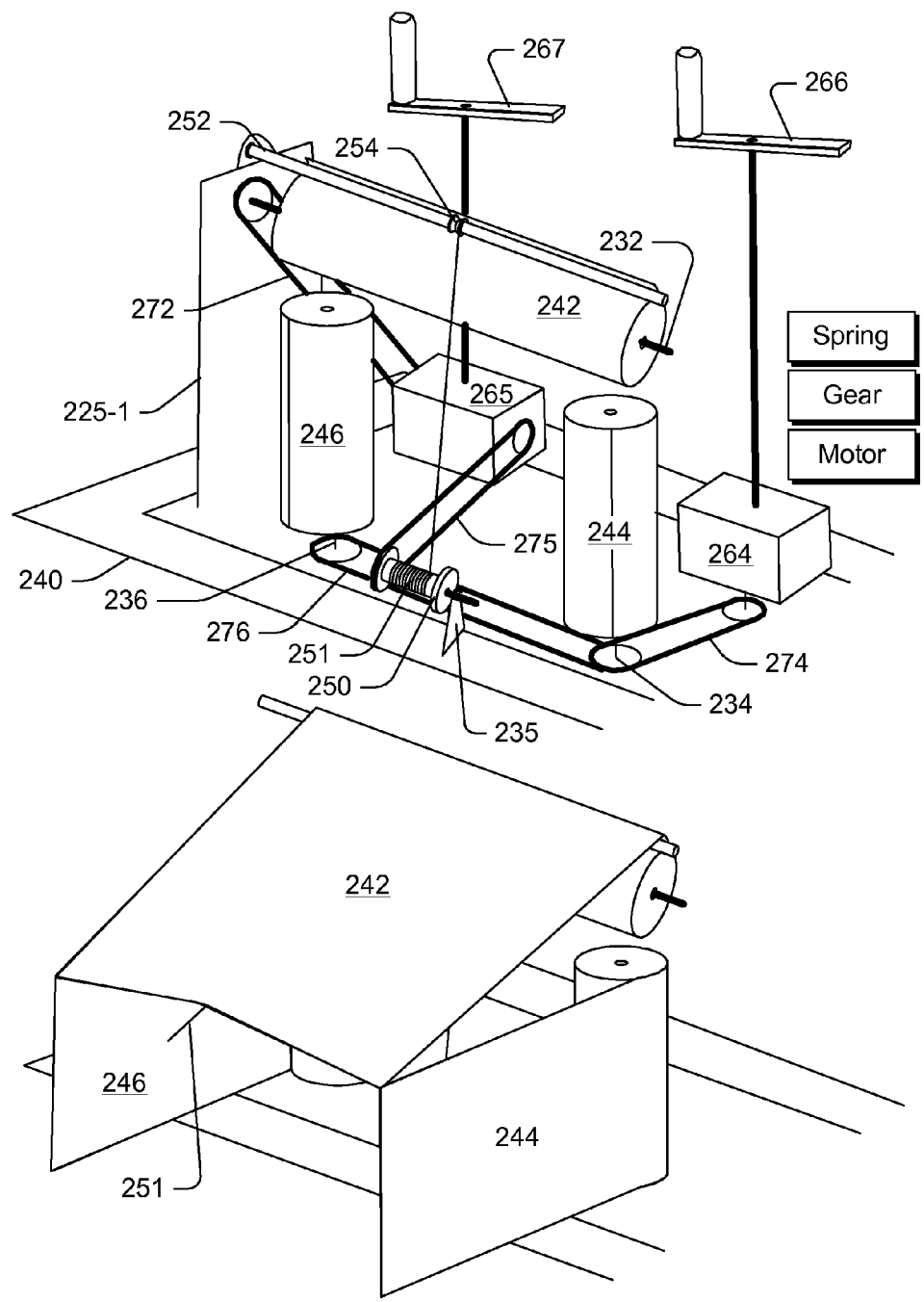
FIG. 2 is a series of perspective views of an example of a material deployment mechanism.

FIG. 2 shows some examples of mechanisms, which may include pulleys, belts, gears, motors, springs, cranks, etc. In the example of FIG. 2, three rolls of material 242, 244 and 246 are carried by respective roller mechanisms 232, 234 and 236. Further, a roll of wire 250 is carried by a roller mechanism 235 to deploy and retract wire 251. In the example of FIG. 2, a support wall 225-1 is shown; noting that another wall may be positioned opposite, for example, for support of the mechanism 232, a wire guide roller 254, etc.

As to the roller mechanisms 232, 234 and 236, these may cooperate with belts or chains 272, 274 and 276. The belts or chains 272, 274 and 276 may cooperate with one or more units such as the units 264 and 265. As described herein, a system can include one or more units that include springs, gears, one or more motors, etc., to provide for deployment, retraction or deployment and retraction of material. The example of FIG. 2 shows optional crank mechanisms 266 and 267, which may extend outside of a housing for access by a person or a machine to actuate one or more mechanisms housed by the housing. The example of FIG. 2 further shows a belt or chain 275 being operatively coupled to the roller mechanism 235 for the roll of wire 250. In this example, the unit 265 can control, optionally independent of the unit 264, at least retraction of the material 242 as carried by the roller mechanism 232. Thus, where a user desires overhead protection of crops, the unit 265 may be controlled (e.g., by crank, electric motor, etc.). Alternatively, or additionally, where a user desired side protection of crops, the unit 264 may be controlled (e.g., by crank, electric motor, etc.).

Figure 3:
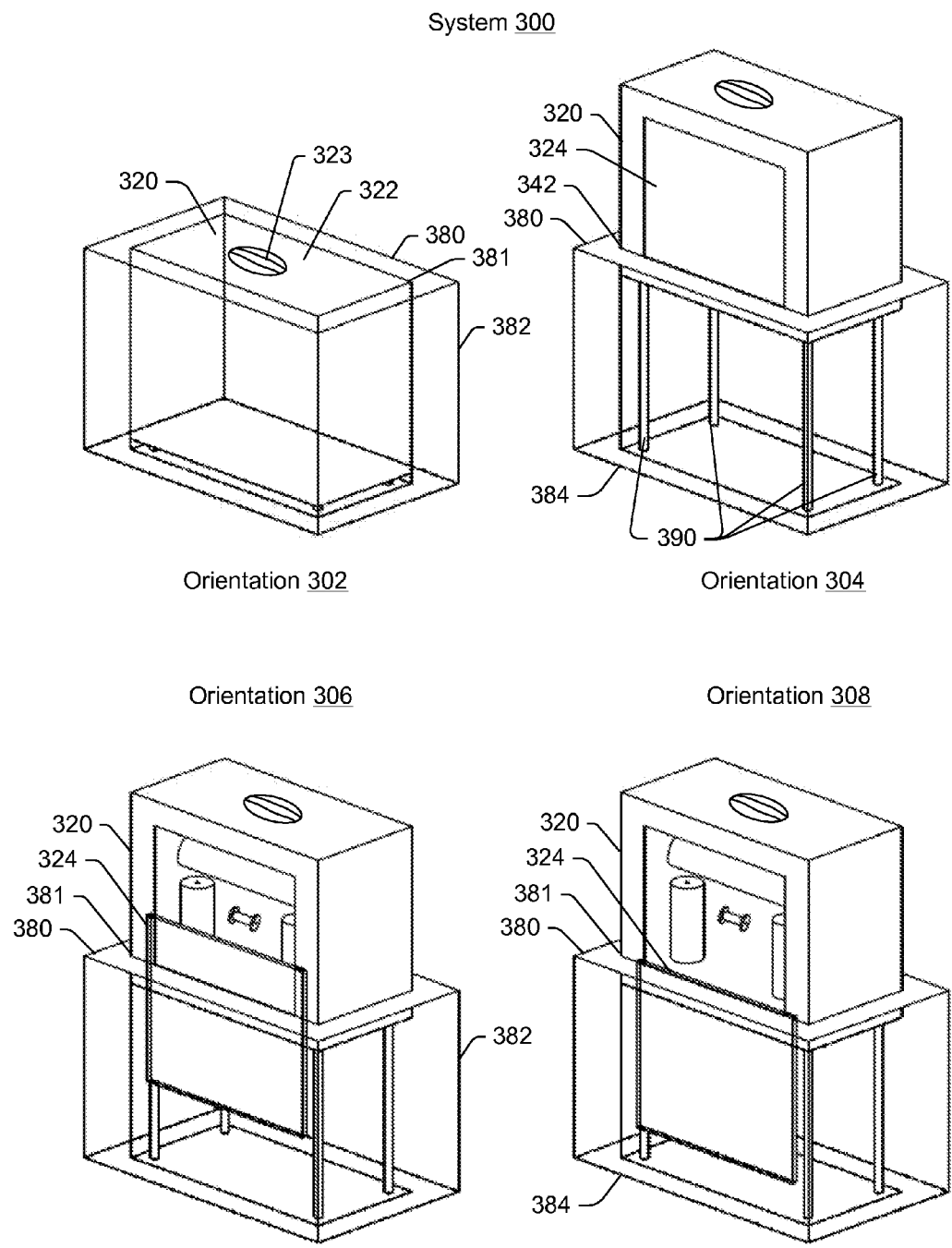
FIG. 3 is a series of perspective views of an example of a system.

FIG. 3 shows an example of a system 300 in four different orientations 302, 304, 306 and 308. In the orientation 302, the housing 320 is disposed in a vault 380 such that the top surface of the housing 322 is flush with an opening 381 of the vault 380. As shown, the vault 380 has vertical sides 382 that meet a floor 384, which may be earthen, cement, etc., to support struts 390. While four struts are shown in the example of FIG. 3, a system may include a different number of struts or optionally another type of lift or vertical adjustment mechanism. In the example of FIG. 3, the housing 320 can include a handle or grip 323 for facilitating vertical adjustment of the housing 320 with respect to the vault 380. For example, the handle or grip 323 may be recessed to allow for a hand, hands or machine (e.g., a hook), etc., to raise the housing 320 as assisted by the struts 390.

In the orientation 304, the system 300 is adjusted vertically to be positioned at least partially above an upper surface of the vault 380, which may be even with surrounding ground. In the orientation 304, the door 324 of the housing 320 is in a closed position. In the orientation 306, the door 324 is shown as being partially retracted downward into the vault 380 to thereby expose the interior of the housing 320. In the orientation 308, the door 324 is in a completely retracted position. As shown, the vertical position of the housing 320 with respect to the vault 380 allows for retraction of the door 324. In such a manner, the door 324 is out of the way and not interfering with deployment or retraction of material housed by the housing 320.

In the example of FIG. 3, the ability to lower the housing 320, such that the top surface 322 of the housing 320 is flush with ground level, can provide ample clearance for equipment (e.g., agricultural equipment). For example, when the top surface 322 of the housing 320 is at ground level, equipment may ride over the housing 320 with damaging the housing 320. Such an arrangement can allow the equipment to tend to crops, a field for crops, etc., in an unhindered manner. Further, the housing 320 may be protected from the elements, animals, debris, etc., which may be disturbed during use of equipment, during harvesting of crops, during planting of crops, during seasonal variations (e.g., snow, wind, rain, hail, etc.), etc. Yet further, the housing 320 may be removable from the vault 380 for purposes of servicing, storage, etc., where an optional cover may be provided to cover the opening 381 of the vault 380.

As described herein, a housing may be constructed in any size, with any dimensions that provide for protection of crops. For example, a housing may be configured for small crops such as strawberries or for larger crops such as corn. As described herein, struts may be telescoping such that a housing can be raised a distance above ground level (e.g., consider several feet above the ground for deployment of material horizontally to protect tops of corn, which may reach six feet or more in height).

As described herein, the struts 390 in the example of FIG. 3 may optionally be hydraulic and operate based on fluid pressure (e.g., hydraulic fluid, water, etc.). A system may include equipment to pressurize and activate struts. Such a system may optionally include a water connection line where upon delivery of water above a certain pressure, a housing rises from a vault. Similarly, upon lowering the water pressure, the housing may be lowered in to the vault. As irrigation systems are commonly available in fields, as described herein, a system may include a hook-up for an irrigation system to vertically adjust the height of a housing with respect to a vault (e.g., using one or more hydraulic struts).

Figure 4:
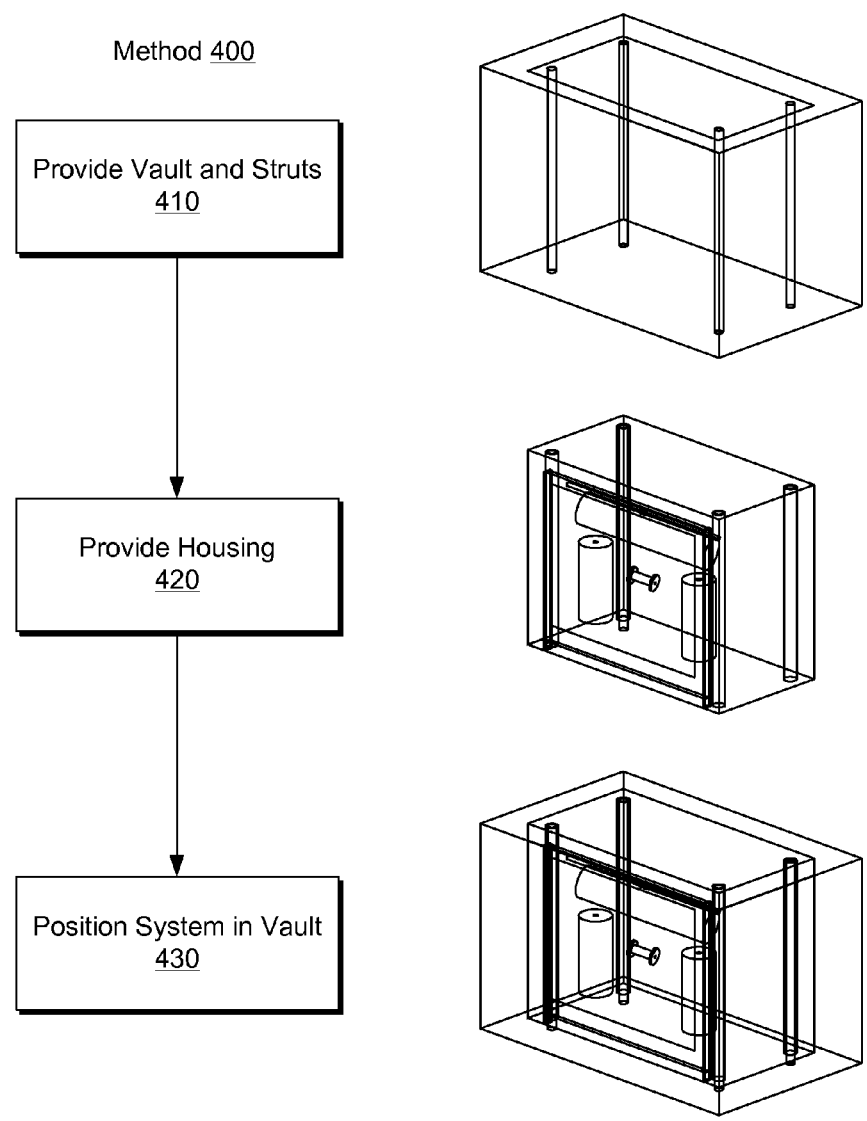
FIG. 4 is a series of views of an example of a system along with an example of a method.

FIG. 4 shows an example of a method 400 along with representations of a system. The method 400 includes a provision block 410 for providing an underground vault and struts, a provision block 420 for providing a crop protection system that includes a housing that houses at least one roll of material, and a position block 430 for positioning the crop protection system in the underground vault where the struts provide for vertically adjusting the crop protection system with respect to the underground vault. Such a method can include vertically adjusting the crop protection system to position at least a portion of the crop protection system above ground.

Figure 5:
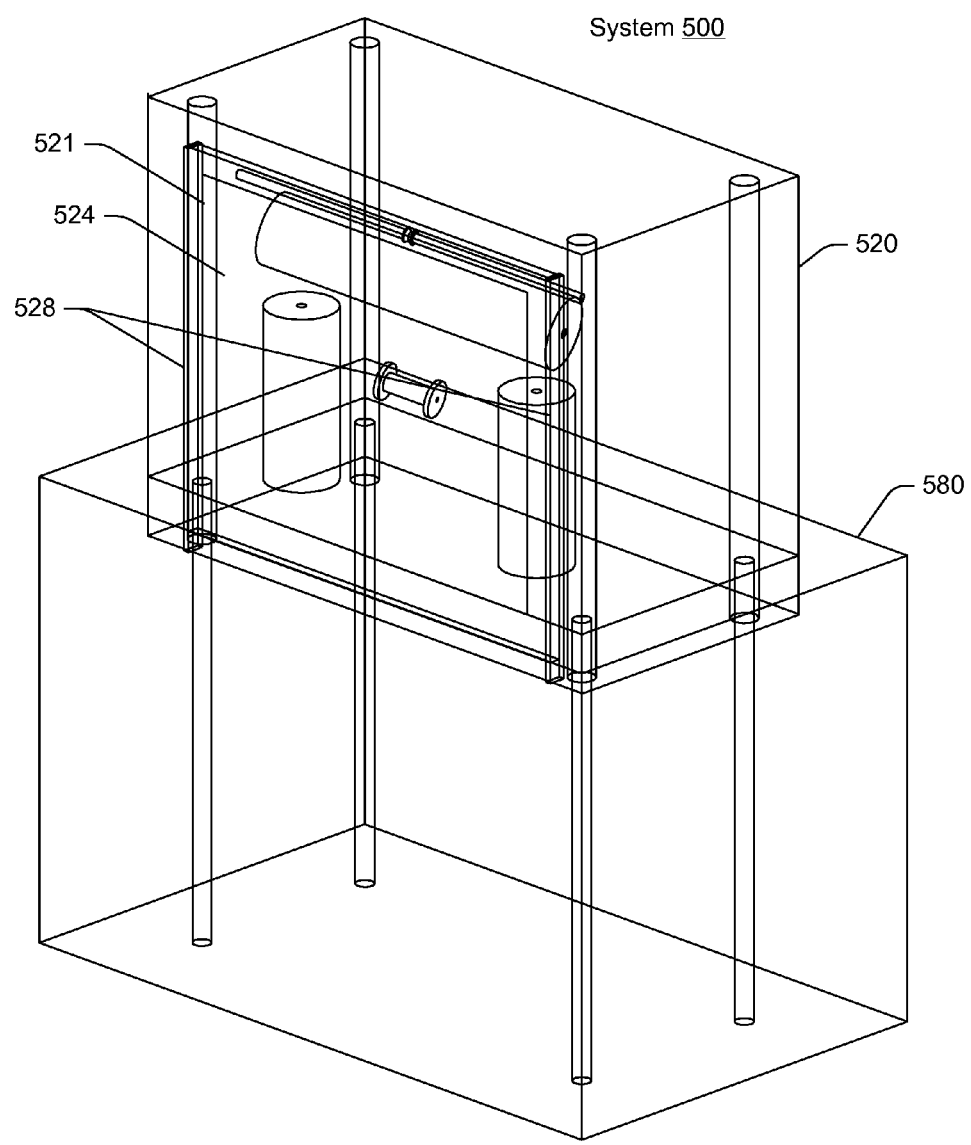
FIG. 5 is a perspective view of an example of a system.

FIG. 5 shows an example of a system 500 that includes a vault 580 and a housing 520 that has an opening 521 that can be covered with a retractable door 524 that slides along door rails 528. In the example of FIG. 5, the retractable door 524 can slide vertically along the rails 528 downward into the vault 580 and similarly upward out of the vault 580 to cover the opening 521 to, for example, prevent debris, animals, etc., from entering the housing 520.

Figure 6:
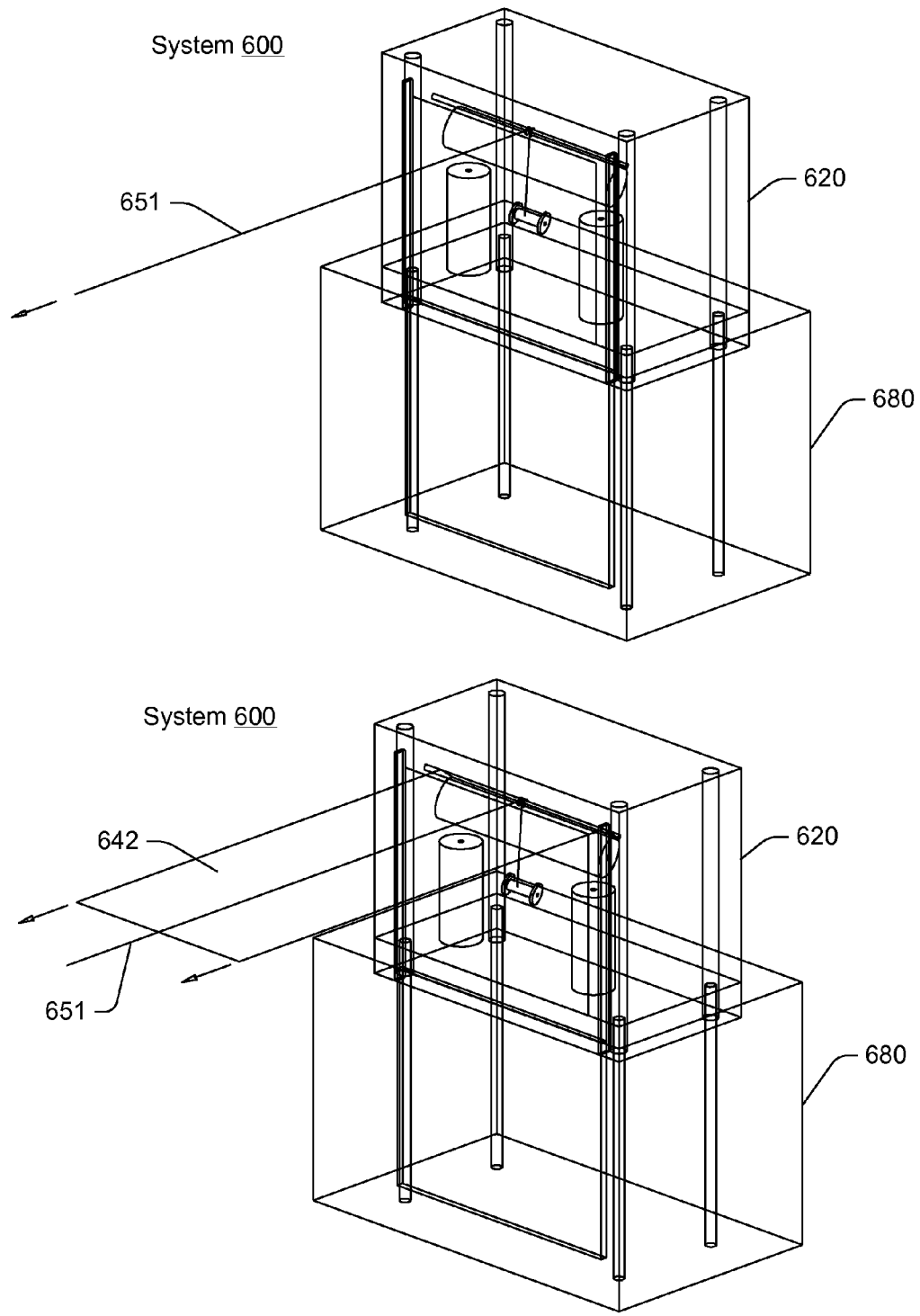
FIG. 6 is a series of perspective views of an example of a system and deployment of material from the system.

FIG. 6 shows an example of a system 600 that includes a housing 620 and a vault 680 with respect to a method of deployment of wire 651 and material 642 from the housing 620. As shown, the wire 651 is deployed and then the material 642 is deployed where the wire 651 supports the material 642.

Figure 7:
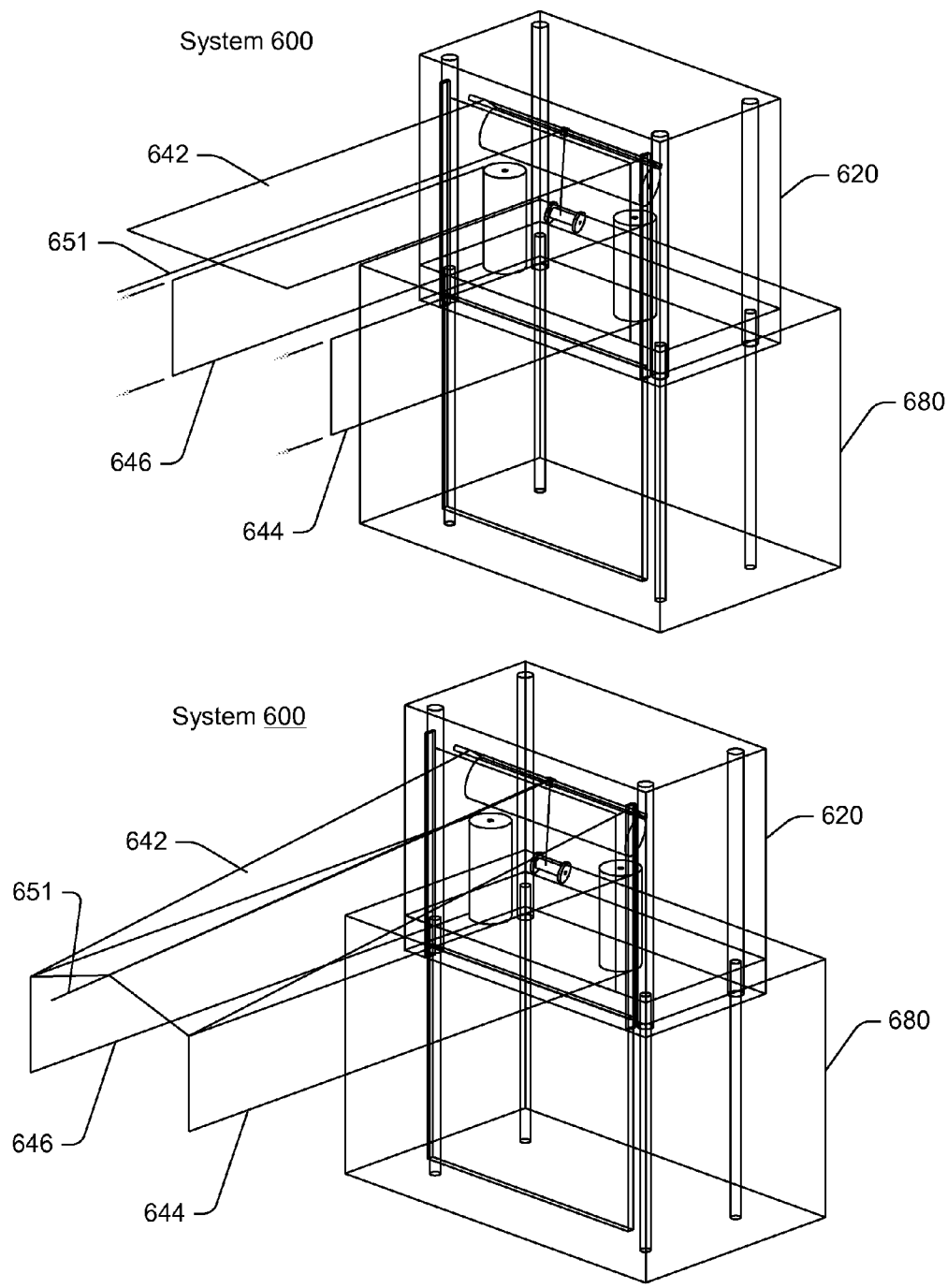
FIG. 7 is a series of perspective views of an example of a system and deployment of material from the system.

FIG. 7 shows the example of the system 600 with respect to a method of deployment material 644 and material 646 from the housing 620. As shown, the wire 651 supports the material 642 and the material 642 may join the material 644 and the material 646 at a corner, edge, etc.

Figure 8:
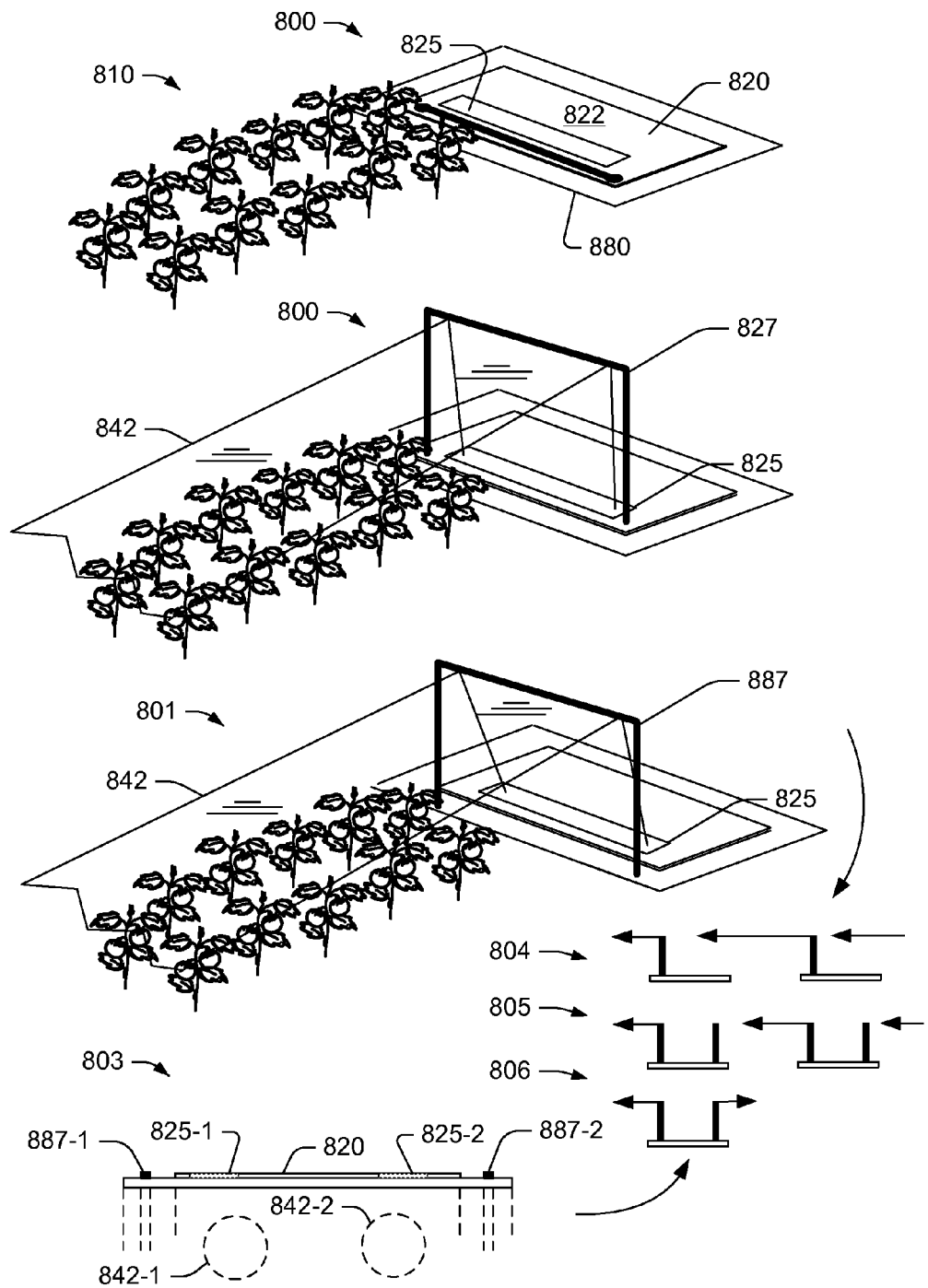
FIG. 8 is a series of perspective views of examples of crop protection systems that include at least one extractable support and at least one top opening.

FIG. 8 shows a series of perspective views of an example of a crop protection system 800 that includes an extractable support 827 of a material housing 820 and another example of a crop protection system 801 that includes an extractable support 887 of a vault 880 as well as a side view of an example of a crop protection system 803 that includes multiple extractable supports 887-1 and 887-2. As shown, the extractable support 827 or the extractable support 887 may be raised from a ground level without raising a material housing 820 from a vault 880. As shown in extracted configurations, the support 827 and the support 887 are raised, for example, to a level greater than that of crops 810 and material 842 is deployed from the material housing 820 via an opening 825 and supported, at least in part, by the extractable support 827 or the extractable support 887. In the example of FIG. 8, the material housing 820 may have a door to open and close the opening 825 on its top surface 822. In a closed configuration, the door acts to prevent debris, etc., from entering the material housing 820. As another example, the material housing 820 may be lifted vertically from the vault 880 and the extractable support 827 or the extractable support 887 may be extracted to gain additional vertical height for supporting deployment of material 842.

As shown in the example system 803, multiple supports 887-1 and 887-2 are provided, each of which may support material 842-1 and 842-2, in one or more configurations. While the example system 803 includes two openings 825-1 and 825-2, a single opening may accommodate material from multiple rolls. FIG. 8 also shows example scenarios 804, 805 and 806 where one or more systems may be implemented for multiple sheets, nets, etc., of material. For example, the scenario 804 includes two systems where a support of one system may support its own material and material from another system. In the example scenario 805, one support supports its own material while another support supports material from another system. In the example scenario 806, the system 803 supports its own material but in two different directions. While various examples show material a distance above the ground, during germination or other periods, material may be optionally positioned on the ground (e.g., to cover germinating seeds, etc.).

In the example scenarios 804 and 805, appropriate hardware may be provided to latch or attach material, wire or material and wire from another system (e.g., to anchor material and wire from another system). As described herein, a system such as the system 100 of FIG. 1 may include one or more features to latch or attach (e.g., anchor) material, wire or material and wire from another system. As an example, consider the top 122 of the system 100 as including one or more eyelets, one or more clamps, etc., for anchoring material, wire or material and wire from another system. In such an example, a system may act as a post to support material, wire or material and wire from another system (see, e.g., FIG. 11).

In the various examples, an extractable support may be shaped as a "U" or other shape. Such a support may be supported by an internal mechanism or by an external mechanism. For example, a support may include a piston within the housing that allows for up and down motion and to fix the support at a particular height. As another example, a support may include apertures where a rod can be inserted in an aperture to lock the support at a particular height above a housing (e.g., where the rod rests against a top of a housing to support the weight of an extracted support).

Figure 9:
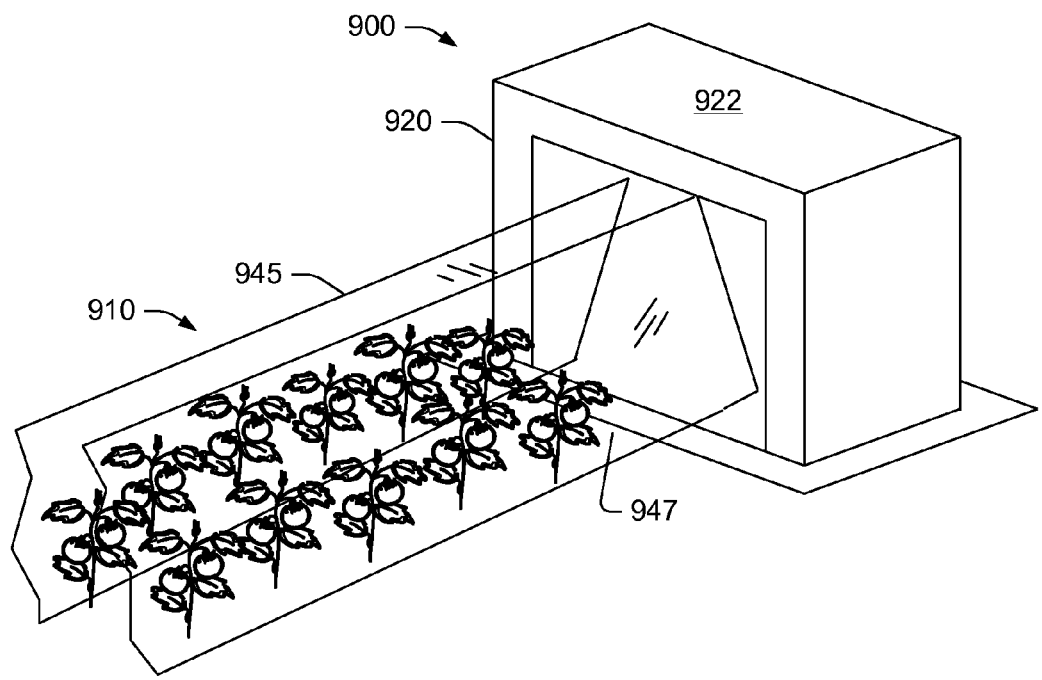
FIG. 9 is a perspective view and an end view of an example of a crop protection system that includes one or more rolls of material disposed at a non-orthogonal angle.
Figure 9:
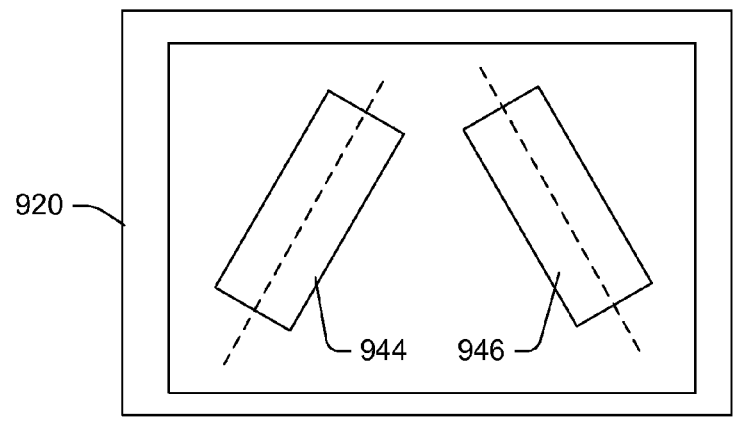

FIG. 9 shows a perspective view and an end view of an example of a crop protection system 900 that includes one or more rolls of material 944 and 946 disposed at a non-orthogonal angle. In the example of FIG. 9, the rolls 944 and 946 are disposed in a material housing 920 at angles non-orthogonal to the ground surface (e.g., and top 922 of the material housing 920). The rolls 944 and 946 may deploy material 945 and 947 in a manner that allows a vent between top edges of the material 945 and 947. In an alternative arrangement, material rolls may be configured or material deployed in a manner where material from one or more rolls covers the tops of crops (e.g., via an overlap, fold, etc.).

Figure 10:
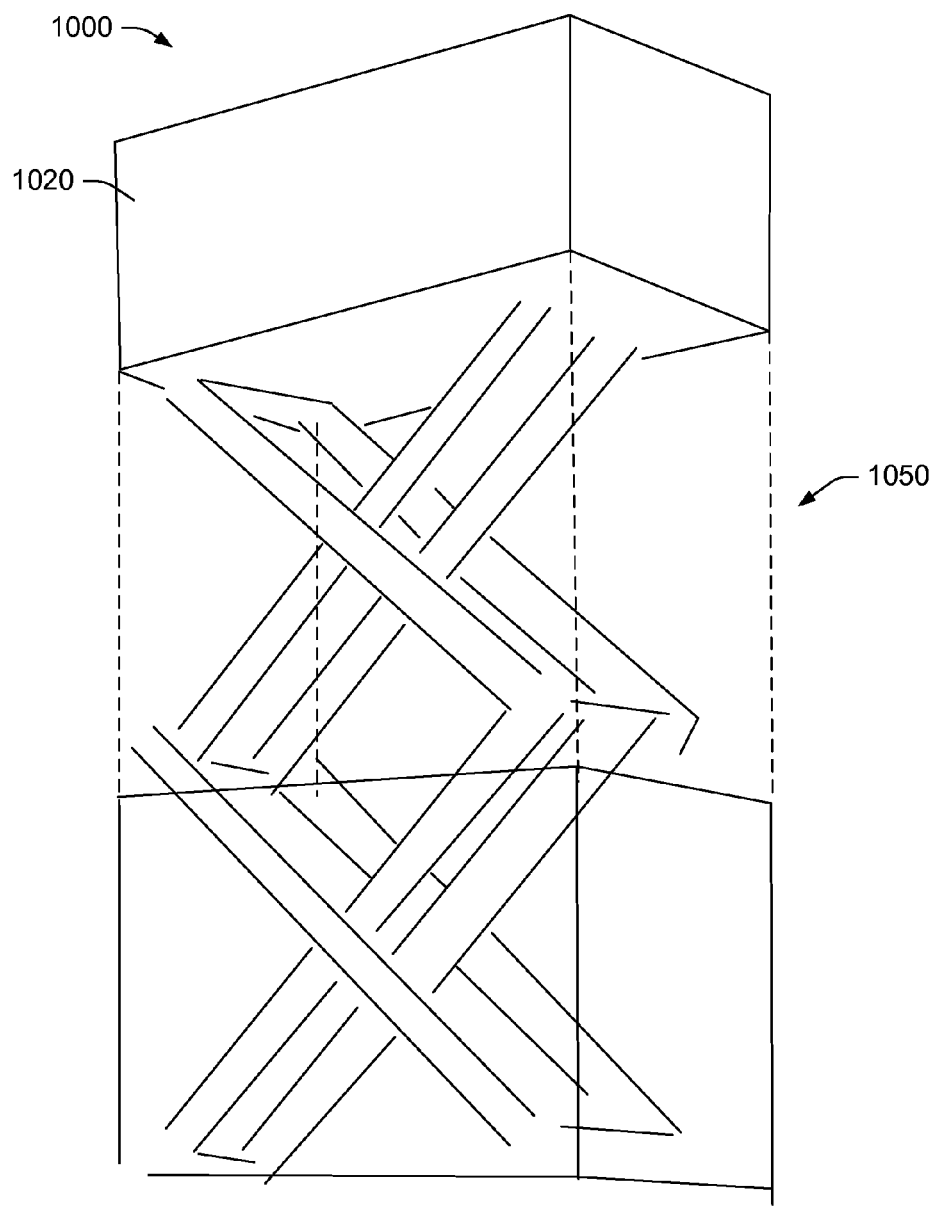
FIG. 10 is a perspective view of an example of a lift mechanism of a crop protection system.

FIG. 10 shows a perspective view of an example of a lift mechanism 1050 of a crop protection system 1000 for lifting a housing 1020. Such a lift mechanism may be a scissor lift and be powered by any of a variety of power sources. For example, a crank system may be provided to cause a scissor lift to extend and retract. As other examples, a hydraulic system, a power-take-off system ("PTO"), a motor system, etc., may be implemented.

As described herein, a lift mechanism, whether using struts, scissors, pistons, etc., may be configured to lift out of a vault with a housing, for example, in the case that any components need to be serviced. As an example, struts may attach to anchor points within a vault where the design of which would then be simplified such that all the mechanical/serviceable items would be located within the housing.

As to a scissor lift type of mechanism, such a mechanism can also function for lifting a housing from a vault. For any of a variety of mechanisms, techniques, features, etc., that help to ensure lateral stability may be employed (e.g., anchors, tethers, etc.). As described herein, a scissor lift mechanism may be provided as part of a housing or part of a vault.

As described herein, a hydraulic activation mechanism may be provided for one or more of "tarp" deployment/retraction methods as well as vertical lifting. Where a power-take-off mechanism is provided, such a mechanism may include a fitting for connection to a vehicle or other electric, gas, etc., powered device (e.g., a tractor, a jeep, etc.). As described herein, a power-take-off can include a splined driveshaft with a direct mechanism (e.g., coupling) or an indirect mechanism (e.g., a winch) for connection and disconnection to a fitting of a crop protection system. Such an approach can help to limit the amount of capital required in terms of installed equipment.

As described herein, one or more intermediate static supports may be provided, for example, of a type typically used to cover crops (e.g., for raspberries or other crops). Such supports may help a covering material to maintain its shape (e.g., between crop protection system installations).

For larger crops (e.g., fruit trees), an increase in any lateral loads may be addressed via one or more anchors (e.g., as used for tents, etc.) or other mechanisms. Lifting of a housing may be accomplished via a single or a multistage hydraulic strut (e.g., as used for some elevators that do not rely on pulleys) or the aforementioned scissor lift mechanism. Other types of accommodations may be provided, for example, directed to a vault (e.g., a distended base). As an example, a reinforced concrete slab may be poured as a base of a vault, which could provide additional resistance to lateral load.

Figure 11:
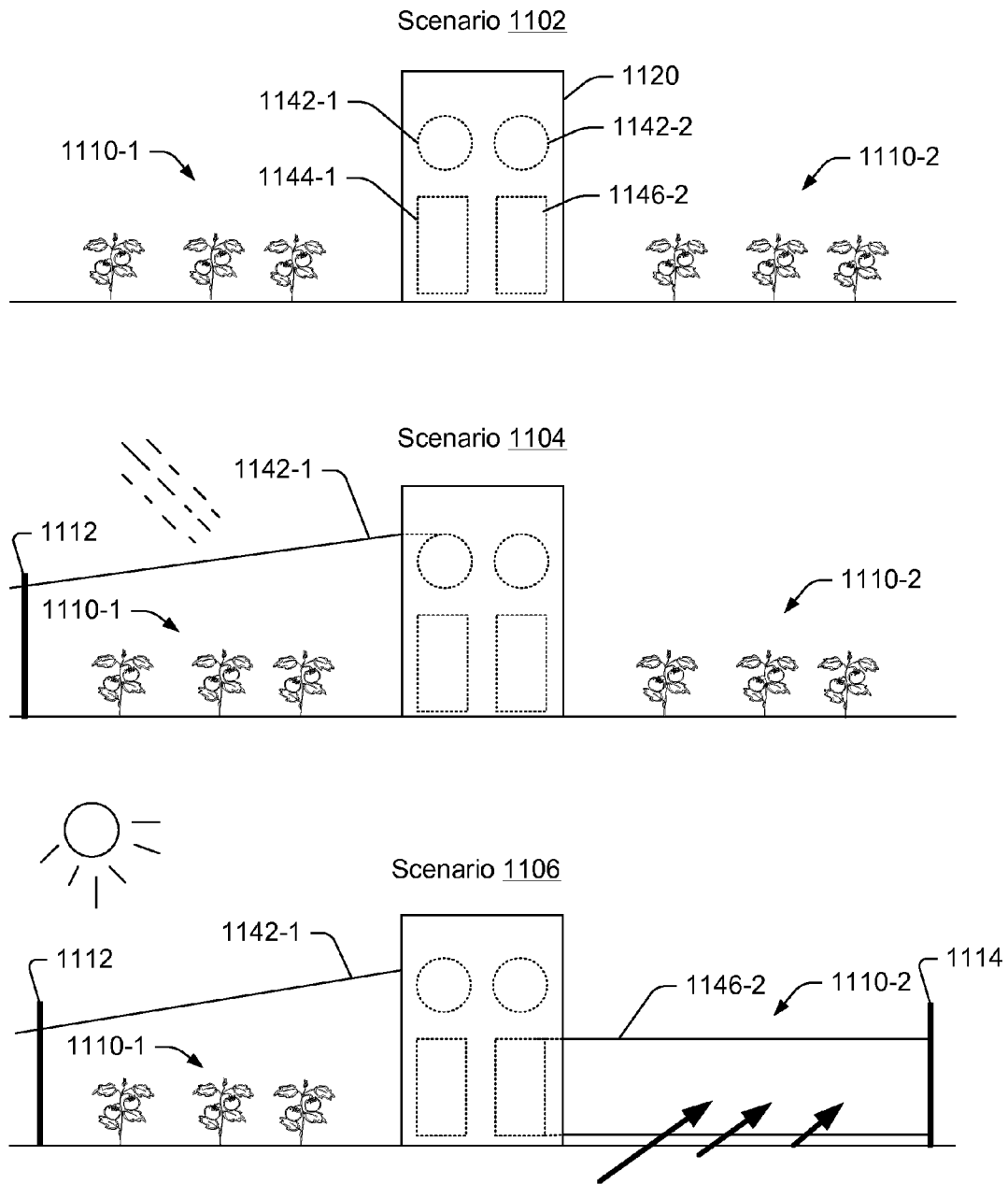
FIG. 11 is a diagram of examples of a system and deployment configurations for material from the system.

FIG. 11 shows various examples of a system 1100 with respect to scenarios 1102, 1104 and 1106 for crops 1110-1 and 1110-2. In the scenario 1102, a system 1100 includes a housing 1120 that houses material such as material 1142-1, 1142-2, 1144-1, 1146-2 (e.g., where additional material may be included as well).

In the scenario 1104, the material 1142-1 is deployed to protect the crops 1110-1, for example, from rain. In such an example, a post 1112 or other equipment may optionally be used to help support the material, wire, the material and wire, etc. As explained with respect to FIG. 8, a system may provide for support of material, wire, etc., from another system. Thus, in the examples of FIG. 11, the post 1112, the post 1114 or both may be replaced by one or more other systems with appropriate hardware (e.g., whether mounted on a top, a side, etc.). The crops 1110-2 may be the same or different than the crops 1110-1 and may be not as susceptible to damage from rain. In such a scenario, while the system 1100 can provide for protection to two rows of crops that extend away from the system 1100 in opposite directions, a user may decide which crops to protect, whether certain crops need protection, etc., and orient the system 1100 accordingly. Further, in the example of FIG. 11, the system 1100 may include material for the crops 1110-2 that differs from the material for the crops 1110-1 (e.g., one may be strawberries while the other is peppers).

In the scenario 1106, the system 1100 has the material 1142-1 deployed (e.g., extending away from the system 1100) to protect the crops 1110-1, for example, from sun damage while also having the material 1146-2 deployed to protect the crops 1110-2, for example, from wind damage (e.g., as indicated by arrows). In such an example, the post 1114 or other equipment may optionally be used to help support the material, wire, the material and wire, etc.

While the example of FIG. 11 shows a two-sided system 1100, as described herein, a system may include three or more sides where each side provides for deployment of material to protect crops. As crops are often planted in rows, an arrangement may include one system at each end of a row or rows. An arrangement may optionally include three systems or more where at one end of a row one system is placed (e.g., single or dual sided), at an intermediate position, a dual sided system is placed and at another end of the row, another system is placed (e.g., single or dual sided). Where a system or systems can be received by a vault, the system or systems may be positioned out of the way of equipment to work a field. Such an arrangement can also act to protect the various components inside a housing when lowered in a vault.

CONCLUSION

Although various examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A crop protection system for crops in at least one row, the crop protection system comprising:
    a housing that comprises roller mechanisms therein, a first roll of material oriented horizontally by a first of the roller mechanisms for material deployment over crops, a second roll of material oriented vertically by a second of the roller mechanisms and a third roll of material oriented vertically by a third of the roller mechanisms for material deployment along respective sides of the crops; and a roll of wire oriented by a fourth of the roller mechanisms for wire deployment under and along a deployed length of material of the first roll of material over crops;
    a vault configured to receive the housing, the vault being positionable at the end of at least one row of crops; and
    a lift mechanism configured to vertically position the housing, the first roll of material, the second roll of material, the third roll of material and the roll of wire with respect to the vault.

2. The crop protection system of claim 1 further comprising at least one motor operatively coupled to at least one of the roller mechanisms.

3. The crop protection system of claim 1 further comprising at least one crank operatively coupled to at least one of the roller mechanisms.

4. The crop protection system of claim 1 further comprising at least one spring operatively coupled to at least one of the roller mechanisms.

5. The crop protection system of claim 1 wherein the housing comprises a retractable door, retractable for access to the roller mechanisms.

6. The crop protection system of claim 1 wherein one of the rolls of material comprises material that differs from that of the other two rolls of material.

7. The crop protection system of claim 1 wherein the vault comprises an underground vault.

8. The crop protection system of claim 1 wherein the first, second and third of the roller mechanisms provide for material deployment and retraction from the first roll of material carried by the first of the roller mechanisms, the second roll of material carried by the second of the roller mechanisms and the third roll of material carried by the third of the roller mechanisms.

9. The crop protection system of claim 1 wherein the lift mechanism comprises a scissor mechanism.

10. The crop protection system of claim 1 wherein the lift mechanism comprises at least one strut.

11. The crop protection system of claim 1 wherein the lift mechanism comprises at least one piston.

12. The crop protection system of claim 1 comprising a power-take-off coupling for activation of the lift mechanism.

13. The crop protection system of claim 1 wherein the lift mechanism configured to vertically position the housing with respect to the vault provides vertical positioning for an orientation of the housing disposed in the vault and vertical positioning for an orientation of the housing positioned at least partially above an upper surface of the vault.

14. The crop protection system of claim 1 comprising an extractable support for support of deployed material carried by at least one of the roller mechanisms of the housing.

* * * * *